(12) United States Patent
Grant et al.

(10) Patent No.: US 9,283,637 B2
(45) Date of Patent: Mar. 15, 2016

(54) FRICTION STIR WELD TOOLS HAVING FINE GRAIN STRUCTURE

(71) Applicant: BATTELLE MEMORIAL INSTITUTE, Richland, WA (US)

(72) Inventors: Glenn J. Grant, Benton City, WA (US); John G. Frye, Richland, WA (US); Jin Yong Kim, Richland, WA (US); Curt A. Lavender, Richland, WA (US); Kenneth Scott Weil, Maumee, OH (US)

(73) Assignee: Battelle Memorial Institute, Richland, WA (US)

( * ) Notice: Subject to any disclaimer, the term of this patent is extended or adjusted under 35 U.S.C. 154(b) by 170 days.

(21) Appl. No.: 13/747,236

(22) Filed: Jan. 22, 2013

(65) Prior Publication Data

US 2013/0126588 A1    May 23, 2013

Related U.S. Application Data

(63) Continuation-in-part of application No. 12/700,923, filed on Feb. 5, 2010.

(51) Int. Cl.
*B22F 3/12* (2006.01)
*B23K 20/12* (2006.01)
*C22C 1/04* (2006.01)
(Continued)

(52) U.S. Cl.
CPC ............ *B23K 20/1245* (2013.01); *B22F 1/0044* (2013.01); *B22F 3/12* (2013.01); *B22F 9/24* (2013.01); *C01G 27/00* (2013.01); *C01G 33/00* (2013.01); *C01G 39/02* (2013.01); *C01G 41/00* (2013.01); *C01G 41/02* (2013.01); *C01G 47/00* (2013.01); *C22C 1/045* (2013.01);
(Continued)

(58) Field of Classification Search
CPC ............ B22F 1/0044; B22F 3/12; B22F 9/24; B23K 20/122; B23K 20/1245; C22C 1/045; C22C 1/058; C22C 27/04
USPC ........ 419/14, 68; 420/430, 432, 433; 228/2.1; 75/343, 363; 977/810
See application file for complete search history.

(56) References Cited

U.S. PATENT DOCUMENTS 3,330,697 A     7/1967  Pechini
5,061,682 A    10/1991  Aksay et al.
(Continued)

OTHER PUBLICATIONS

A.S. Mukasyan and P. Dinka, "Novel Approached to Solution-Combustion Synthesis of Nanomaterials," International Journal of Self-Propagating High-Temperature Synthesis, vol. 16, No. 1, pp. 23-25, 2007.

(Continued)

*Primary Examiner* — Helene Klemanski
(74) *Attorney, Agent, or Firm* — Wells St. John P.S.

(57) ABSTRACT

Tools for friction stir welding can be made with fewer process steps, lower cost techniques, and/or lower cost ingredients than other state-of-the-art processes by utilizing improved compositions and processes of fabrication. Furthermore, the tools resulting from the improved compositions and processes of fabrication can exhibit better distribution and homogeneity of chemical constituents, greater strength, and/or increased durability. In one example, a friction stir weld tool includes tungsten and rhenium and is characterized by carbide and oxide dispersoids, by carbide particulates, and by grains that comprise a solid solution of the tungsten and rhenium. The grains do not exceed 10 micrometers in diameter.

24 Claims, 5 Drawing Sheets

10 μm

(51) Int. Cl.

| | | |
|---|---|---|
| *C22C 27/04* | (2006.01) | |
| *B22F 1/00* | (2006.01) | |
| *B22F 9/24* | (2006.01) | |
| *C01G 33/00* | (2006.01) | |
| *C01G 39/02* | (2006.01) | |
| *C01G 41/02* | (2006.01) | |
| *C01G 47/00* | (2006.01) | |
| *C22C 1/05* | (2006.01) | |
| *C01G 27/00* | (2006.01) | |
| *C01G 41/00* | (2006.01) | |

(52) U.S. Cl.
CPC ............... *C22C 1/058* (2013.01); *C22C 27/04* (2013.01); *C01P 2004/03* (2013.01); *C01P 2004/04* (2013.01)

(56) References Cited

U.S. PATENT DOCUMENTS

| | | | |
|---|---|---|---|
| 5,114,702 A | 5/1992 | Pederson et al. | |
| 5,984,997 A | 11/1999 | Bickmore et al. | |
| 6,171,571 B1 | 1/2001 | Bedard et al. | |
| 6,183,716 B1 | 2/2001 | Sleight et al. | |
| 6,835,367 B2 | 12/2004 | James et al. | |
| 7,022,155 B2 | 4/2006 | Deegan et al. | |
| 7,032,800 B2 | 4/2006 | Subramanian et al. | |
| 7,337,940 B2 | 3/2008 | Subramanian et al. | |
| 7,449,128 B2 | 11/2008 | Krishna et al. | |
| 8,361,178 B2 * | 1/2013 | Liu et al. | 51/309 |
| 2005/0129565 A1 * | 6/2005 | Ohriner et al. | 420/432 |
| 2005/0211018 A1 | 9/2005 | Jurewicz et al. | |
| 2008/0223175 A1 | 9/2008 | Lunk et al. | |
| 2010/0136369 A1 * | 6/2010 | Ayer et al. | 428/683 |
| 2010/0279146 A1 * | 11/2010 | Rowe et al. | 228/2.1 |
| 2011/0194970 A1 * | 8/2011 | Frye et al. | 75/343 |

OTHER PUBLICATIONS

Mukasyan et al., "Solution combustion synthesis of nanomaterials," Proceedings of the Combustion Institute, 31 (2007), pp. 1789-1795.

S. Sasikumar and R. Vijayaraghavan, "Solution combustion synthesis of bioceramic calcium phosphates by single and mixed fuels—A comparative study," Ceramics International, 34, pp. 1373-1379, available online Apr. 10, 2007.

Sergi L. Gonzales-Cortes, et al, "Rationalizing the catalytic performance of y-alumina-supported Co(Ni)-Mo(W) HDS catalysts prepared by urea-matrix combustion synthesis," Catalysis Letters, vol. 111, Nos. 1-2, pp. 57-66, Oct. 2006.

Naik, Mallari A; Mishra, Braja Gopal; Dubey, Amit, "Combustion synthesized WO3-ZrO2 nanocomposites as catalyst for the solvent-free synthesis of courmarins," Colloids and Surfaces A: Physiochem. Eng. Aspects, 317 (2008) pp. 234-238.

\* cited by examiner

10 μm    W-4 mol% Re-0.5wt% Ni

10 μm

FRICTION STIR WELD TOOLS HAVING FINE GRAIN STRUCTURE

CROSS-REFERENCE TO RELATED APPLICATIONS

This invention claims priority from and is a continuation-in-part of currently pending patent application Ser. No. 12/700,923, filed Feb. 5, 2010, which application is incorporated herein by reference.

STATEMENT REGARDING FEDERALLY SPONSORED RESEARCH OR DEVELOPMENT

This invention was made with Government support under Contract DE-AC0576RL01830 awarded by the U.S. Department of Energy. The Government has certain rights in the invention.

BACKGROUND

During friction stir welding, two pieces of metal can be mechanically intermixed at the place of the join. During intermixing, the materials can be transformed into a softened state that allows the metal to be fused using mechanical pressure. A friction stir weld is made with a rotating tool that is plunged into a material along a joint line, and then translated along the joint. The tool, therefore, is preferably wear-resistant and exhibits high strength, toughness, oxidation resistance, and low thermal conductivity. Widespread commercial applications of friction stir welding will require the development of cost-effective and durable tools.

SUMMARY

This document describes compositions, and processes of fabrication, of tools for friction stir welding. According to embodiments described herein, tools can be made with fewer process steps, lower cost techniques, and/or lower cost ingredients than other state-of-the-art processes. Furthermore, the resultant tool compositions can exhibit improved distribution and homogeneity of chemical constituents, greater strength, and/or increased durability.

In one embodiment, a friction stir weld tool comprises tungsten and rhenium and is characterized by carbide and oxide dispersoids, by carbide particulates, and by grains that comprise a solid solution of the tungsten and rhenium. The grains do not exceed 10 micrometers in diameter. In some embodiments, the grains have a diameter between 100 nm and 1 micrometer.

The rhenium can be less than or equal to 20 wt % of the tool. Alternatively, the rhenium can be less than or equal to 10 wt % of the tool. Preferably, the rhenium is less than or equal to 5 wt %.

In some instances, the material properties and performance improve as grain size decreases. The improvement can be sufficient to allow changes in tool composition that would normally be undesirable because it results in poor material properties and performance. For example, with sufficiently small grain size, the friction stir weld tool can have substantially no nickel. Alternatively, or in addition, the friction stir weld tool can exclude rhenium.

Friction stir weld tools according to embodiments described herein can exhibit a hardness value of at least 450 $H_V$ at room temperature. As used herein, $H_V$ refers to the Vickers hardness.

The dispersoids can be located in the grains, on the grains, or both. In some embodiments, the tool comprises both hafnium carbide and cerium oxide as carbide and oxide dispersoids, respectively.

In some embodiments, the carbide particulates can comprise hafnium carbide. Preferably, the carbide particulates are uniformly distributed in the tool. For example, the volume fraction of carbide particulate in any 50 cubic micrometer volume the tool falls within 1 standard deviation of the mean volume fraction of carbide particulate in any 500 cubic micrometer volume of a dense solid provided the carbide particulate is 1 to 5 micron in size.

In some embodiments, the tool comprises substantially equiaxed grains and an even size distribution of grains. For example, 80% of the grains can be within 1 standard deviation of a mean grain size in any 500 cubic micron volume of the tool.

In one embodiment, a friction stir weld tool comprises tungsten and is characterized by carbide and oxide dispersoids and by grains having diameters between 100 nm and 10 micrometers, wherein the grains comprise tungsten and substantially no rhenium.

Methods for fabricating friction stir weld tools comprising tungsten and rhenium can be characterized by providing a nanopowder and comminuting a mixture comprising the nanopowder, particulates comprising a carbide compound and an oxide material. The nanopowder comprises crystallites having an average crystallite diameter between 20 and 60 nanometers and comprises tungsten. The methods further comprise sintering the mixture at a temperature and for a time such that the tool has grains not exceeding 10 micrometers in diameter, and forming carbide and oxide dispersoids in the tool from at least a portion of the carbide compound and the oxide material, respectively.

In various embodiments, the crystallites can comprise tungsten and rhenium in a solid solution. The carbide can comprise hafnium carbide. The oxide material can comprise cerium oxide. In one example, the oxide material is contained in a sol.

One example of comminuting includes, but is not limited to, milling the mixture in water.

Preferably, the temperature for the sintering is less than or equal to 1600° C. The time, in one embodiment, is less than or equal to 5 hours. In another, it is less than or equal to 2 hours.

One example of a method for fabricating a friction stir weld tool is characterized by synthesizing a nanopowder from an aqueous solution comprising tungsten and rhenium precursors, crystallites of the nanopowder having an average diameter between 20 and 60 nanometers and comprising a solid solution of tungsten and less than 10 wt % rhenium. A mixture comprising water, the nanopowders, hafnium carbide particulates, and a sol comprising cerium oxide is then comminuted and the mixture compacted. The mixture can then be sintered at a temperature less than or equal to 1600° C. for a time less than or equal to 5 hours such that the tool has grains not exceeding 10 micrometers in diameter, and such that hafnium carbide and cerium oxide dispersoids form in the tool from at least a portion of the hafnium carbide particulates and the cerium oxide, respectively. Preferably, the synthesizing step further comprises forming tungsten carbide dispersoids from excess carbon in the aqueous solution, wherein the tungsten carbide dispersoids are located in, or on, the crystallites.

The purpose of the foregoing summary is to enable the United States Patent and Trademark Office and the public generally, especially the scientists, engineers, and practitioners in the art who are not familiar with patent or legal terms or phraseology, to determine quickly from a cursory inspection the nature and essence of the technical disclosure of the application. The summary is neither intended to define the invention of the application, which is measured by the claims, nor is it intended to be limiting as to the scope of the invention in any way.

Various advantages and novel features of the present invention are described herein and will become further readily apparent to those skilled in this art from the following detailed description. In the preceding and following descriptions, the various embodiments, including the preferred embodiments, have been shown and described. Included herein is a description of the best mode contemplated for carrying out the invention. As will be realized, the invention is capable of modification in various respects without departing from the invention. Accordingly, the drawings and description of the preferred embodiments set forth hereafter are to be regarded as illustrative in nature, and not as restrictive.

DESCRIPTION OF DRAWINGS

Embodiments of the invention are described below with reference to the following accompanying drawings.

DETAILED DESCRIPTION

Figure 1:
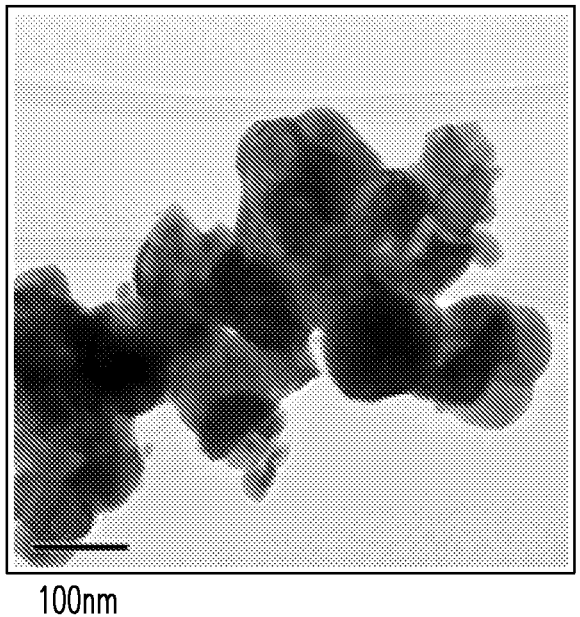
FIG. 1 includes a scanning electron microscope (SEM) micrograph of an agglomerated crystallite after combustion synthesis according to embodiments of the present invention.

The following description includes the preferred best mode of one embodiment of the present invention. It will be clear from this description of the invention that the invention is not limited to these illustrated embodiments but that the invention also includes a variety of modifications and embodiments thereto. Therefore the present description should be seen as illustrative and not limiting. While the invention is susceptible of various modifications and alternative constructions, it should be understood, that there is no intention to limit the invention to the specific form disclosed, but, on the contrary, the invention is to cover all modifications, alternative constructions, and equivalents falling within the spirit and scope of the invention as defined in the claims.

Processes for fabricating tools embodied by the description provided herein can include W—Re nanophase powder production, mixing with secondary phases, and densification. The W—Re nanopowders are produced using either combustion synthesis (Glycine Nitrate process) or by a spray pyrolysis process. The resulting powders, which commonly comprise primarily metal oxides, are then placed in a vacuum furnace for reduction to W—Re alloy metal powder. The reduced powder can then be mixed with secondary phases. For example, the W—Re nanopowder can be mixed with various quantities of HfC particulate and CeO sol in an aqueous media. In one instance, the mixture is ball milled for 4 hrs using YSZ milling media. Immediately after mixing, the aqueous suspension is poured onto a tray and liquid nitrogen is added to cover the powder bed. This tray is inserted in a freeze dryer and dried for 12 hrs until all moisture is removed.

The dried powder is then collected and put through a process of densification. Densification can be done in one of several ways including, but not limited to, cold isostatic pressing (CIP) with sintering, hot isostatic pressing (HIP), and CIP with sintering and HIP. According to one example involving the CIP and sinter approach, the powder is loaded into a latex cylindrical "can" and CIPed at 50,000 psi. The cylinders of compacted powder are then sintered at 1200 to 1400 C for 2 hours. The final compacts are then machined to shape. Alternatively the powders after freeze drying can be placed in a stainless steel cylindrical can and HIPed, for example, at 1100° C. and 15,000 psi for 11 hours, followed by machining to final shape. This is a significantly lower temperature than traditional HIP, which can occur at temperatures at or above 1700° C.

Preferably, the constituents in the tool are uniformly distributed throughout the composition. Uniform distribution can be quantified by measures described elsewhere herein. Alternatively, uniform distribution can be characterized by a coefficient of variation (COV) value as described by Yang et al. in "Simulation and quantitative assessment of homogeneous and inhomogeneous particle distributions in particulate metal matrix composites" (see Journal of Microscopy, Vol. 201, Pt 2, February 2011, pp. 189-200), which is incorporated herein by reference. A COV of mean near-neighbor distance (d-mean) can be a powerful parameter to identify homogeneity. In one instance, a $COV_{d\text{-}mean}$ value of 0.36 is preferred and can be a standard indication of homogeneity. Values departing from this standard can be acceptable depending on the needs of a particular FSW tool application (i.e., tool specifications versus cost considerations).

According to one embodiment, a combustion synthesis procedure can be used to produce an appropriate nanopowder from which a friction stir weld tool can be fabricated. A similar combustion synthesis procedure is described in U.S. patent application Ser. No. 12/700,923, which is incorporated herein by reference. In one example, a 93.9 wt % W-6.0 wt % Re-0.1 wt % Ni modified glycine nitrate process (GNP) powder was produced, which yielded approximately 100 g of a nano-particulate W—Re—Ni metal powder after reduction.

The reactants included standard grade Ammonium Metatungstate (AMT) {$(NH_4)_6H_2W_{12}O_{40} \cdot 5H_2O$; F.W.=3048.076 g/mole; % W by Wt.=72.38%} as a source of W, Nickel(II) Nitrate hexahydrate {$Ni(NO_3)_2 \cdot 6H_2O$; F.W.=290.81 g/mole; % Ni by Wt.=20.19%} as the source of Ni, and Ammonium Perrhenate (APR) {$NH_4ReO_4$; F.W.=268.24 g/mole; Assay: % Re by Wt.=69.4%} as the source of Re. The reactants further included ethanolamine {$(NH_2)CH_2CH_2OH$; F.W.=61.09 g/mole}, 70% Nitric Acid Solution {$HNO_3$; F.W.=63.01 g/mole}, and deionized water. The amounts of reactants were determined as follows.

93.90 g W÷0.7238=129.73 g (0.042561 mole) of AMT needed 6.00 g Re÷0.694=8.65 g (0.032247 mole) of APR needed 0.10 g Ni÷0.2019=0.50 g (0.001719 mole) of Ni(NO3)2·6H2O needed AMT:APR:Ni(NO)3 molar ratio=1:0.758:0.040

In addition, the stable combustion synthesis solution comprised a molar ratio of AMT:Ethanolamine equal to 1:4.154. Therefore, the molar ratio of AMT:APR:Ni(NO$_3$)$_2$:Ethanolamine was 1:0.758:0.040:4.154.

In order to produce the necessary stoichiometric burn when combusted, equal amounts of oxidizing and reducing capacity must be present in the combustion synthesis solution. Additional details regarding the determination of oxidizing and reducing capacities of various materials is provided by J. J. Kingsley and L. R. Pedersen in "Energetic Materials in Ceramic Synthesis" (Mat. Res. Soc. Symp. Proc. 296 (1993) 361-366), which details are incorporated herein by reference. Briefly, the molecular formulas of each of the reagents are determined to be either net oxidizing agents or net reducing agents on a per mole basis. The relative molar ratios of the reagents required for a stoichiometric burn can then be calculated. The oxidizing and reducing capacities for the reagents of the present example are determined as follows.

| | |
|---|---|
| For AMT = (NH$_4$)$_6$H$_2$W$_{12}$O$_{40}$ | N = 6 × 0 = 0 |
| | H = 26 × −1 = −26 |
| | O = 40 × +2 = +80 |
| | W = 12 × −6 = −72 |
| Sum = | −18 per mole (net reducing) |
| For APR = NH$_4$ReO$_4$ | N = 1 × 0 = 0 |
| | H = 4 × −1 = −4 |
| | O = 4 × +2 = +8 |
| | Re = 1 × −7 = −7 |
| Sum = | −3 per mole (net reducing) |
| For Ni(NO$_3$)$_2$ | N= 2 × 0 = 0 |
| | O = 6 × +2 = +12 |
| | Ni = 1 × −2 = −2 |
| Sum = | +10 per mole (net oxidizing) |
| For Ethanolamine = (NH$_2$)CH$_2$CH$_2$(OH) | N = 1 × 0 = 0 |
| | H = 7 × −1 = −7 |
| | C = 2 × −4 = −8 |
| | O = 1 × +2= +2 |
| Sum = | −13 per mole (net reducing) |
| For HNO$_3$ | N = 1 × 0 = 0 |
| | H = 1 × −1 = −1 |
| | O = 3 × +2 = +6 |
| Sum = | +5 per mole (net oxidizing) |
| For H$_2$O | H = 2 × −1 = −2 |
| | O = 1 × +2 = +2 |
| Sum = | 0 per mole (inert) |

Next, the components of the solution were compared and the required molar ratios were calculated for producing a stoichiometric burn ratio as follows:

| | |
|---|---|
| 1 × AMT (@ −18 per mole) = | −18 (net reducing) |
| 0.758 × APR (@ −3 per mole) = | −2.274 (net reducing) |
| 4.154 × Ethanolamine (@ −13 per mole) = | −54 (net reducing) |
| 0.040 Ni(NO3)2 (@ +10 per mole) = | +0.40 (net oxidizing) |
| | −73.874 (net reducing) |

For a stoichiometric burn, net oxidizers need to equal net reducers, therefore +73.874 of net oxidizers (HNO$_3$ in this case) also needs to be added to the solution. (+73.874÷+5 per mole of HNO$_3$=14.775 moles of HNO3 per mole of AMT is needed).

The resulting solution comprised a molar ratio of AMT:APR:Ni(NO$_3$)$_2$:Ethanolamine:HNO$_3$ equal to 1:0.758:0.040:4.154:14.775.

The combustion synthesis solution comprising the reactants in the amounts described above can be prepared in two steps. A first solution (Soln.A) is prepared by adding Ni(NO$_3$)$_2$, ½ of the total amount of D.I. water, HNO3 solution, and ethanolamine, which is then set aside. A second solution (Soln. B) is prepared by dissolving the APR in the second ½ of the D.I. water while heating on a hotplate. Then, after all of the APR has dissolved, the AMT is added. The two solutions are then mixed together to obtain the final combustion synthesis solution. The amounts of materials used in the solution preparation are calculated as follows.

Solution A Ni Nitrate+½ of the D.I. Water+HNO$_3$ solution+Ethanolamine)

1) 0.50 g of Ni(NO$_3$)$_2$·6H$_2$O
2) 75 g of D.I. Water
3) 14.775×(0.042561 mole)×63.01 g/mole HNO$_3$÷0.70=56.60 g of 70 wt. % HNO$_3$ solution
4) 4.154×(0.042561 mole)×61.09 g/mole Ethanolamine=10.80 g of Ethanolamine Solution B (APR+½ of the D.I. Water+AMT)

1) 8.65 g of APR
2) 75 g of D.I. Water
3) 129.73 g of AMT

The combustion synthesis solution burn was carried out using a 4 L stainless steel beaker, which is heated on a hotplate to near red heat temperature. After the hotplate has heated the beaker bottom to near red heat, the entire combustion synthesis solution is quickly poured into the hot beaker, and the beaker is covered with a clean 100 mesh sieve to contain most of the solid particles produced, while allowing steam and combustion gasses to escape from the beaker. Steam is rapidly evolved for ~8-10 minutes, then red colored NO$_x$ fumes are evolved as the combustion process begins to initiate. When the NO$_x$ evolution subsides, the beaker containing the porous ash is removed from the hotplate and allowed to cool to room temperature. Typically, the entire burn process can be completed within less than 15 minutes. After cooling, the ash is recovered from the beaker, and ground to a fine powder, typically dark blue in color. The finely divided powder was recovered and was ready to be reduced.

Referring to FIG. 1, a scanning electron microscope (SEM) micrograph shows agglomerated crystallites directly after combustion synthesis (agglomerates are hundreds of nanometers across, but composed of <10 nm crystallites. The small sizes allow for unique behavior in compaction according to embodiments of the present invention.

Figure 2A:
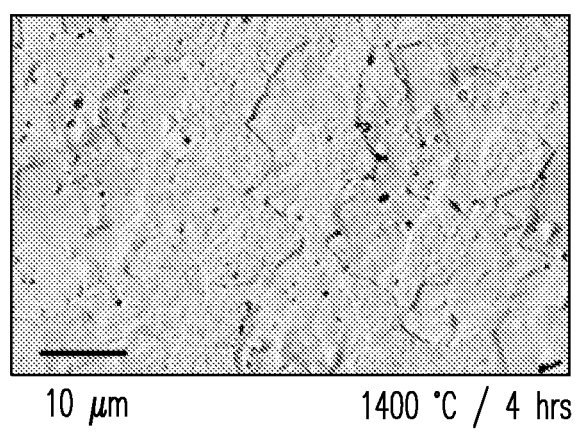
FIGS. 2A and 2B include micrographs of dense compacts after sintering according to embodiments of the present invention.
Figure 2B:
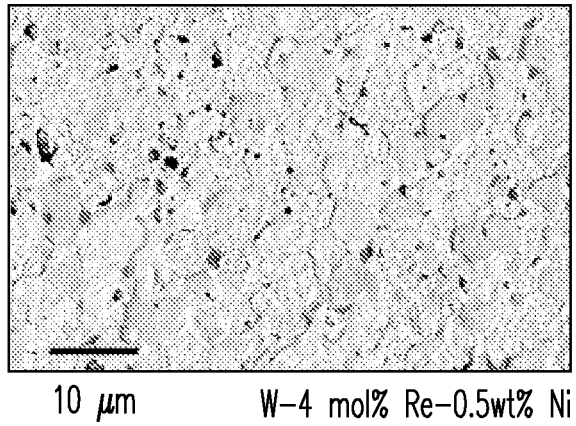

For example, the nanopowders allow for higher sintered density at lower temperature and less time at temperature. The micrograph in FIG. 2A shows a 98.6% dense compact after sintering at 1400 C for 4 hours, which is a much lower temperature and a much shorter time than commercial products with large powder sizes traditionally require. FIG. 2B shows grain size at about 5-8 micron, which is much finer than the conventional processes produce, but not as fine as can be produced in optimized conditions of embodiments of the present invention. Furthermore, there is no need for additional processing to subsequently work the structure to reduce grain size from hundreds of microns to tens of microns at high temperatures, such as approximately 1800 C.

Figure 3:
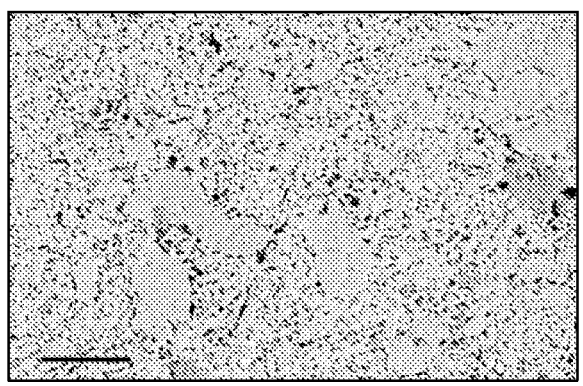
FIG. 3 includes a micrograph obtained from a W-4% Re—HfC sample that shows greater than 90% density and WRe grain size below 900 nm with only sintering, according to embodiments of the present invention.

Synthesis of friction stir weld tools from nanopowders also allow for retaining fine grain size at high density with only very small (0.1%) Ni added (it is typically necessary to add Ni to get tungsten to sinter at low temperatures, but the grain size balloons up to hundreds of microns). The micrograph in FIG. 3 shows W-4% Re—HfC that shows greater than 90% density and WRe grain size below 900 nm by only CIP and sintering, without any post-densification working at elevated temperatures. Traditionally, one must put work into this alloy to get a grain size this small either through hot isostatic pressing, swaging, and/or extrusion.

Figure 4A:
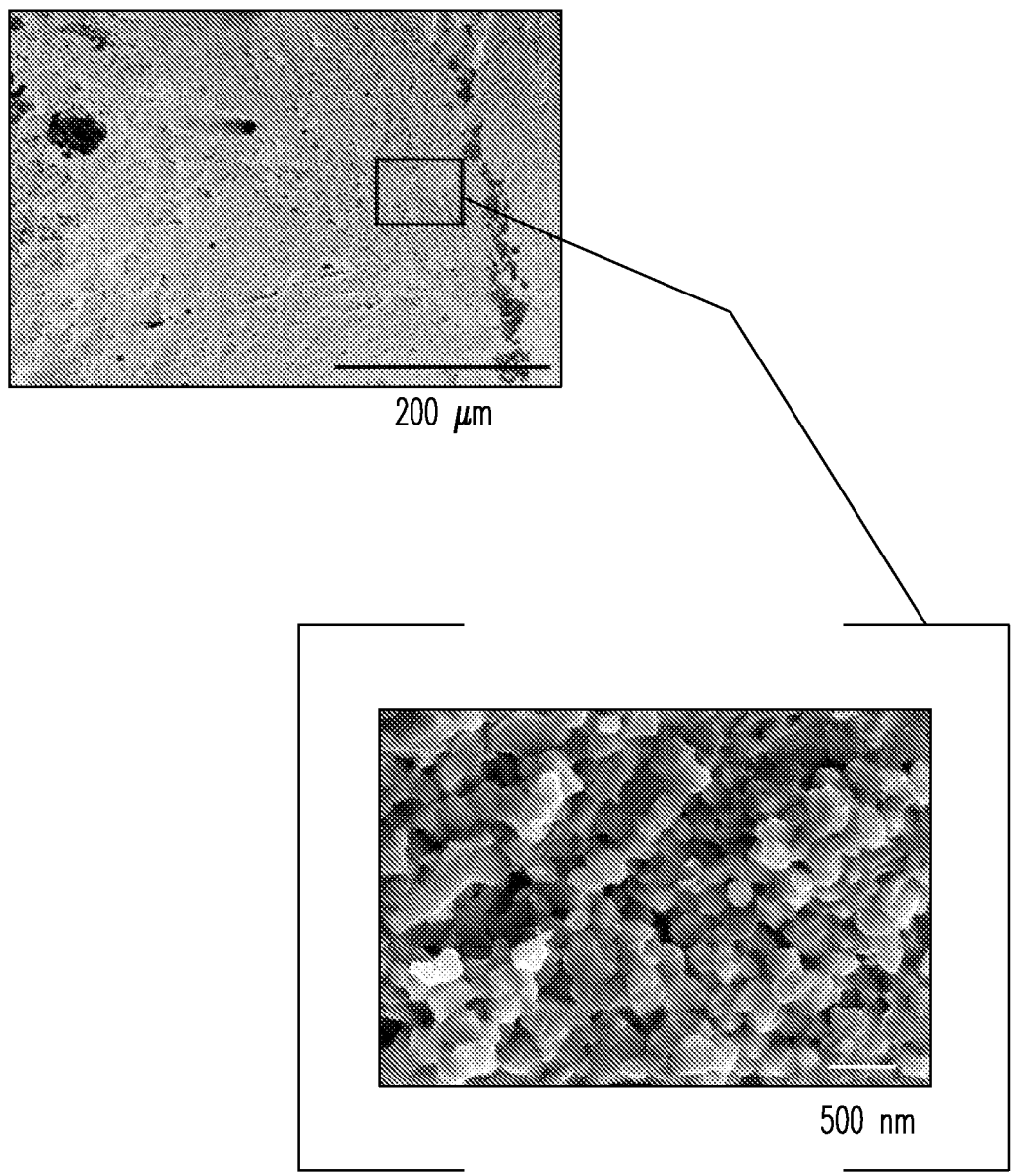
FIGS. 4A and 4B include micrographs showing a fractured surface (4A) and a polished surface (4B) at two levels of detail of one embodiment that was 96.8% dense and exhibited grain sizes near 100 nm.
Figure 4B:
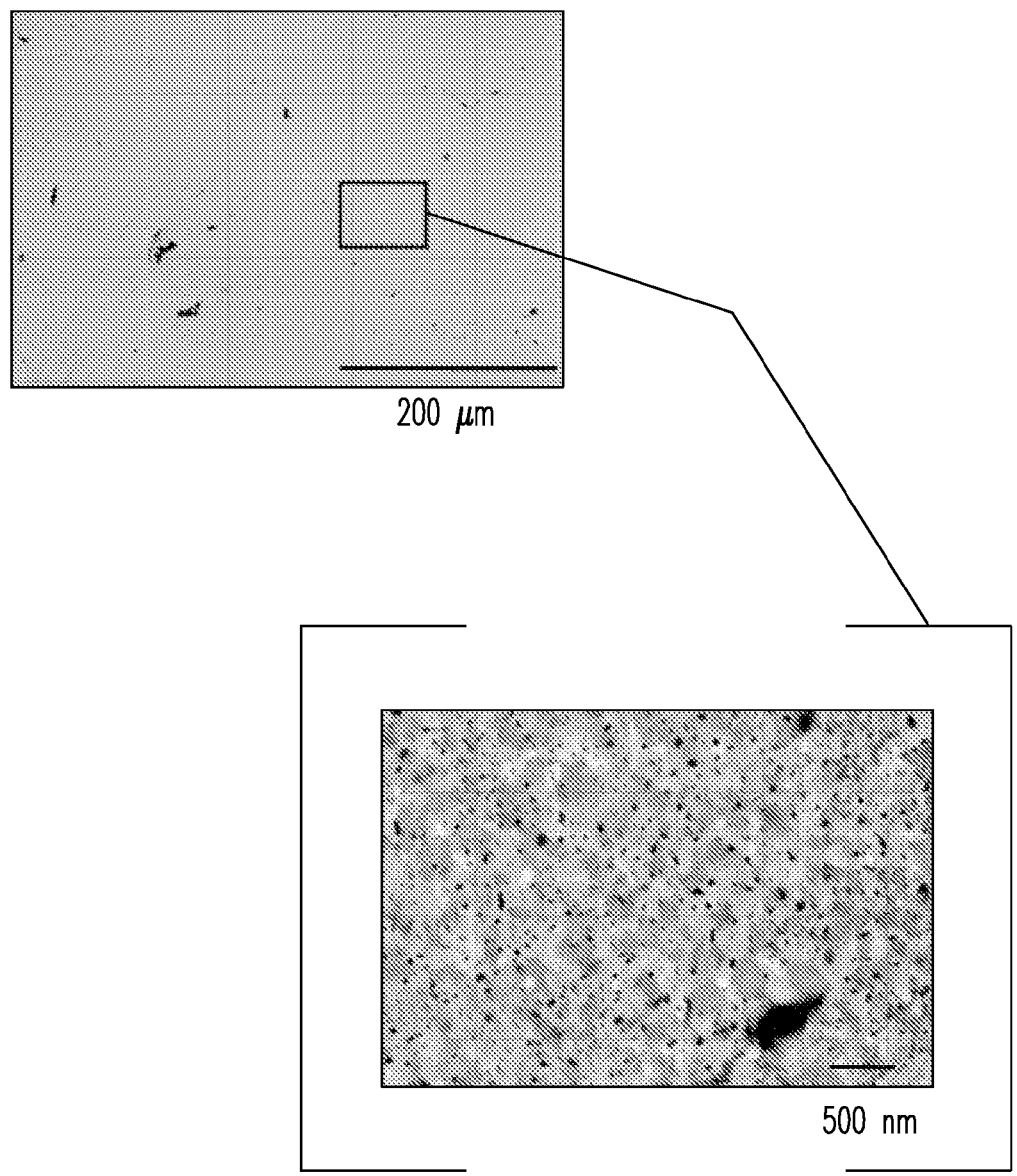

Embodiments of the present invention can include a wet milling step before consolidation that dramatically improves densification and allows for retention of fine grain size. FIG. 4A includes micrographs showing a fractured surface at two levels of detail. FIG. 4B includes micrographs showing a polished surface at two levels of detail. The sample from which the micrographs were obtained was 96.8% dense and exhibited grain sizes near 100 nm. The micrographs exhibit the extremely small grain sizes and the high homogeneity of HfC particulate (see small black dots in FIG. 4B) distribution, which can be characteristics of embodiments of the present invention.

Figure 5:
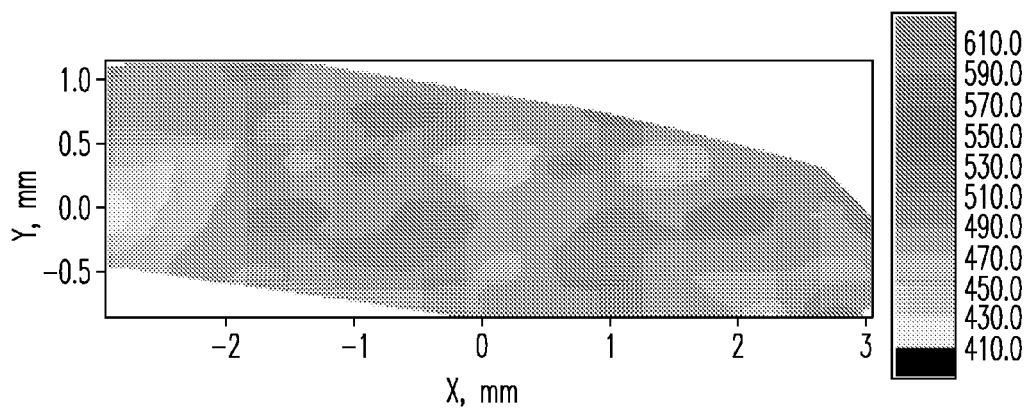
FIG. 5 is a mapping of hardness of an FSW tool prepared by conventional means.
Figure 6:
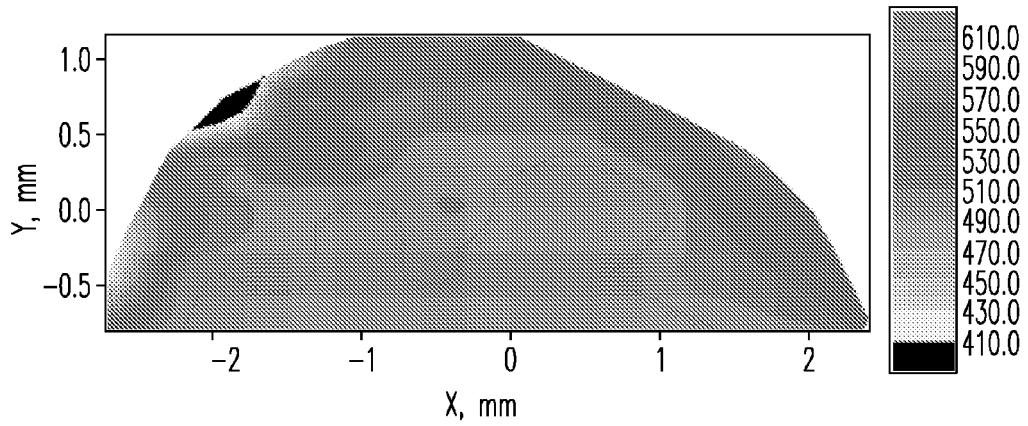
FIG. 6 is a mapping of hardness of a W-6Re-0.1Ni—HfC—CeO FSW tool according to embodiments of the present invention.

Embodiments of the present invention also exhibit improved hardness. FIG. 5 includes a mapping of hardness from a W—Re—HfC friction stir weld tool that was prepared conventionally by sintering at a temperature greater than 2000 C and extruded at 1800 C. In comparison, a W-6Re-0.1Ni—HfC—CeO tool prepared according to embodiments of the present invention by sintering alone resulted in much higher hardness values across the mapping (see FIG. 6). The tool was ball milled with alumina media and heat treated at 1650 C for 2 hours.

While a number of embodiments of the present invention have been shown and described, it will be apparent to those skilled in the art that many changes and modifications may be made without departing from the invention in its broader aspects. The appended claims, therefore, are intended to cover all such changes and modifications as they fall within the true spirit and scope of the invention.

We claim:

1. A friction stir weld tool comprising tungsten and rhenium, the tool further comprising carbide and oxide dispersoids, carrbide particulates, and grains not exceeding 10 micrometers in diameter, wherein the grains comprise a solid solution of the tungsten and rhenium.

2. The friction stir weld tool of claim 1 having substantially no nickel.

3. The friction stir weld tool of claim 1, wherein the rhenium is less than or equal to 20 wt % of the tool.

4. The friction stir weld tool of claim 1, wherein the rhenium is less than or equal to 10 wt % of the tool.

5. The friction stir weld tool of claim 1, wherein the rhenium is less than or equal to 6 wt % of the tool.

6. The friction stir weld tool of claim 5, wherein the tool has a hardness of at least 450 $H_V$ at room temperature.

7. The friction stir weld tool of claim 1, wherein the grains have a diameter between 100 nm and 1 micrometer.

8. The friction stir weld tool of claim 1, wherein the dispersoids are located in the grains, on the grains, or both.

9. The friction stir weld tool of claim 1 having both hafnium carbide and cerium oxide as carbide and oxide dispersoids, respectively.

10. The friction stir weld tool of claim 1, wherein the carbide particulates comprise hafnium carbide.

11. The friction stir weld tool of claim 1, having a uniform distribution of carbide particulates in the tool, wherein the volume fraction of carbide particulate in any 50 cubic micrometer volume of the tool falls within 1 standard deviation of the mean volume fraction of carbide particulate in any 500 cubic micrometer volume of a dense solid provided, the carbide particulate is 1 to 5 micron in size.

12. The friction stir weld tool of claim 1, having substantially equiaxed grains and an even size distribution of grains, wherein 80% of the grains are within 1 standard deviation of a mean grain size in any 500 cubic micron volume of the tool.

13. A friction stir weld tool comprising tungsten, the tool further comprising carbide and oxide dispersoids and grains having diameters between 100 nm and 10 micrometers, wherein the grains comprise tungsten and substantially no rhenium.

14. A method of fabricating a friction stir weld tool comprising tungsten and rhenium, the method comprising the steps of:
   Providing a nanopowder comprising crystallites having an average crystallite diameter between 20 and 60 nanometers and comprising tungsten;
   Comminuting a mixture comprising the nanopowder, particulates comprising a carbide compound, and an oxide material;
   Compacting the mixture; and
   Sintering the mixture at a temperature and for a time such that the tool has grains not exceeding 10 micrometers in diameter; and
   Forming carbide and oxide dispersoids in the tool from at least a portion of the carbide compound and the oxide material, respectively.

15. The method of claim 14, wherein the crystallites comprise tungsten and rhenium in a solid solution.

16. The method of claim 14, wherein the carbide compound comprises hafnium carbide.

17. The method of claim 14, wherein the oxide material comprises cerium oxide.

18. The method of claim 14, wherein the oxide material is contained in a sol.

19. The method of claim 14, wherein said comminuting step comprises milling the mixture in water.

20. The method of claim 14, wherein the temperature is less than or equal to 1600° C.

21. The method of claim 14, wherein the time is less than or equal to 5 hours.

22. The method of claim 14, wherein the time is less than or equal to 2 hours.

23. A method of fabricating a friction stir weld tool comprising tungsten and rhenium, the method comprising the steps of:
   Synthesizing a nanopowder from an aqueous solution comprising tungsten and rhenium precursors, crystallites of the nanopowder having an average diameter between 20 and 60 nanometers and comprising a solid solution of tungsten and less than 10 wt % rhenium;
   Comminuting a mixture comprising water, the nanopowders, hafnium carbide particulates, and a sol comprising cerium oxide;
   Compacting the mixture; and
   Sintering the mixture at a temperature less than or equal to 1600° C. for a time less than or equal to 5 hours such that the tool has grains not exceeding 10 micrometers in diameter, and such that hafnium carbide and cerium oxide dispersoids form in the tool from at least a portion of the hafnium carbide particulates and the cerium oxide, respectively.

24. The method of claim 23, wherein said synthesizing further comprises forming tungsten carbide dispersoids from excess carbon in the aqueous solution, the tungsten carbide dispersoids located in, or on, the crystallites.

\* \* \* \* \*